United States Patent
Imanishi et al.

(10) Patent No.: US 11,165,326 B2
(45) Date of Patent: Nov. 2, 2021

(54) EDDY CURRENT DECELERATING APPARATUS

(71) Applicant: NIPPON STEEL CORPORATION, Tokyo (JP)

(72) Inventors: Kenji Imanishi, Tokyo (JP); Takuya Fujita, Tokyo (JP); Hiroyuki Yamaguchi, Tokyo (JP); Hiroshi Nogami, Tokyo (JP); Yasutaka Noguchi, Tokyo (JP); Mitsuo Miyahara, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/964,283

(22) PCT Filed: Jan. 23, 2019

(86) PCT No.: PCT/JP2019/001943
§ 371 (c)(1),
(2) Date: Jul. 23, 2020

(87) PCT Pub. No.: WO2019/146608
PCT Pub. Date: Aug. 1, 2019

(65) Prior Publication Data
US 2021/0036595 A1 Feb. 4, 2021

(30) Foreign Application Priority Data
Jan. 29, 2018 (JP) .............................. JP2018-012117

(51) Int. Cl.
*H02K 49/04* (2006.01)
*H02K 7/104* (2006.01)
(Continued)

(52) U.S. Cl.
CPC ............ *H02K 49/043* (2013.01); *H02K 7/104* (2013.01); *H02K 49/10* (2013.01); *H02K 7/102* (2013.01);
(Continued)

(58) Field of Classification Search
CPC ........ H02K 7/10; H02K 7/102; H02K 7/1021; H02K 7/104; H02K 49/00; H02K 49/04; H02K 49/046; H02K 49/10; H02K 49/104
(Continued)

(56) References Cited

U.S. PATENT DOCUMENTS

2003/0221920 A1 12/2003 Kuwahara
2011/0057533 A1* 3/2011 Murakami ........... H02K 1/2766
310/156.43
(Continued)

FOREIGN PATENT DOCUMENTS

JP 2557740 B2 12/1997
JP 2004032927 A 1/2004
(Continued)

*Primary Examiner* — Tulsidas C Patel
*Assistant Examiner* — Rashad H Johnson
(74) *Attorney, Agent, or Firm* — Greer Burns & Crain Ltd.

(57) ABSTRACT

A decelerating apparatus includes a brake member, primary and secondary permanent magnets and pole pieces. The primary permanent magnets are arranged in a circumferential direction to face an inner or outer peripheral surface of the brake member with a gap in between. Each of the primary permanent magnets has two opposite magnetic poles arranged in a radial direction. The secondary permanent magnets and the pole pieces are placed in the gap and arranged in the circumferential direction. Each of the secondary permanent magnets has two opposite magnetic poles arranged in the circumferential direction. Each of the pole pieces is positioned between adjacent secondary permanent (Continued)

magnets. Magnetic pole arrangements of adjacent primary permanent magnets are opposite to each other. Magnetic pole arrangements of adjacent secondary permanent magnets are opposite to each other. Each of the secondary permanent magnets has a trapezoidal cross-sectional shape including an upper base and a lower base.

4 Claims, 2 Drawing Sheets

(51) Int. Cl.
*H02K 49/10* (2006.01)
*H02K 7/102* (2006.01)
*H02K 49/00* (2006.01)

(52) U.S. Cl.
CPC ............ *H02K 7/1021* (2013.01); *H02K 49/00* (2013.01); *H02K 49/04* (2013.01); *H02K 49/046* (2013.01); *H02K 49/104* (2013.01)

(58) Field of Classification Search
USPC ...... 310/71, 75 R, 89, 92, 93, 105, 112, 114, 310/123, 156.01, 156.36
See application file for complete search history.

(56) References Cited

U.S. PATENT DOCUMENTS

2017/0005561 A1* 1/2017 Imanishi ................ H02K 7/104
2018/0294707 A1* 10/2018 Nagai ................... H02K 49/106

FOREIGN PATENT DOCUMENTS

JP 2004048963 A 2/2004
JP 2007082333 A 3/2007

* cited by examiner

EDDY CURRENT DECELERATING APPARATUS

This is a National Phase Application filed under 35 U.S.C. § 371, of International Application No. PCT/JP2019/001943, filed Jan. 23, 2019, the contents of which are incorporated by reference.

TECHNICAL FIELD

The present disclosure relates to a decelerating apparatus to be mounted in a vehicle, such as a truck, a bus or the like, as an auxiliary brake. More particularly, the present disclosure relates to an eddy current decelerating apparatus that uses permanent magnets to generate braking force.

BACKGROUND ART

Generally, an eddy current decelerating apparatus includes a cylindrical brake member. The brake member is fixed to a rotary shaft of a vehicle. Typically, at an inner side of the brake member, a plurality of permanent magnets are arranged around the rotary shaft. In a gap between the inner peripheral surface of the brake member and the outer peripheral surfaces of the magnets, a plurality of pole pieces are arranged around the rotary shaft. By a switching mechanism, the positions of the magnets relative to the pole pieces are changed, and thereby, the eddy current decelerating apparatus is switched between a braking state and a non-braking state.

Eddy current decelerating apparatuses are classified into an axially sliding type and a circumferentially rotating type, depending on how the switching mechanism changes the positions of the magnets. In an eddy current decelerating apparatus of an axially sliding type, as described in Japanese Utility Model No. 2557740 (Patent Literature 1) for example, an actuator moves the magnets along the axis of the rotary shaft and thereby switches the eddy current decelerating apparatus between a braking state and a non-braking state. In the eddy current decelerating apparatus disclosed in Patent Literature 1, in the braking state, the magnets are positioned inside the brake member, and magnetic fluxes outgoing from the magnets reach the brake member through the pole pieces. On the other hand, in the non-braking state, the magnets are moved along the axis of the rotary shaft by the actuator to go away from the brake member. Accordingly, magnetic fluxes outgoing from the magnets do not reach the brake member.

The eddy current decelerating apparatus of an axially sliding type requires a large space for the axial movements of the magnets. On the other hand, in an eddy current decelerating apparatus of a circumferential rotating type, as described in Japanese Patent Application Publication No. 2004-48963 (Patent Literature 2) for example, the magnets are moved along the circumference of the brake member, and thereby, the eddy current decelerating apparatus is switched between a braking state and a non-braking state. Thus, this type of eddy current decelerating apparatus saves space.

In the eddy current decelerating apparatus disclosed in Patent Literature 2, in a braking state, each of the magnets almost entirely faces a pole piece, and a magnetic flux outgoing from the magnet reaches the brake member through the pole piece. Thus, magnetic circuits are formed between the magnets and the brake member. Accordingly, on the inner peripheral surface of the brake member rotating together with the rotary shaft, eddy currents are generated. As a result, breaking torque acts on the brake member, and the rotating speed of the rotary shaft is reduced. On the other hand, in a non-braking state, the magnets are circumferentially moved such that each of the magnets is positioned across two adjacent pole pieces. In this state, magnetic fluxes outgoing from the magnets substantially do not reach the brake member. Then, magnetic circuits are formed between the magnets and the pole pieces, and no magnetic circuits are formed between the magnets and the brake member. Accordingly, no eddy currents are generated on the inner peripheral surface of the brake member, and no braking torque is generated.

An eddy current decelerating apparatus disclosed in Japanese Patent Application No. 2004-32927 (Patent Literature 3) and an eddy current decelerating apparatus disclosed in Japanese Patent Application No. 2007-82333 (Patent Literature 4) each have primary magnets and secondary magnets that are arranged around a rotary shaft. The secondary magnets are provided between the primary magnets and a brake member and embedded in a magnetic member. For a switch between a braking state and a non-braking state, the primary magnets are circumferentially moved, and thereby, the positional relationship between the primary magnets and the secondary magnets is adjusted. According to Patent Literatures 3 and 4, in the braking state, magnetic fluxes outgoing from the primary magnets and the secondary magnets reach the brake member. In the non-braking state, magnetic short-circuiting is caused between the primary magnets and the secondary magnets, and magnetic blocking circuits are formed.

CITATION LIST

Patent Literatures

Patent Literature 1: Japanese Utility Model No. 2557740
Patent Literature 2: Japanese Patent Application Publication No. 2004-48963
Patent Literature 3: Japanese Patent Application Publication No. 2004-32927
Patent Literature 4: Japanese Patent Application Publication No. 2007-82333

SUMMARY OF INVENTION

Technical Problem

In recent years, the performance of vehicles is being improved. Accordingly, decelerating apparatuses are required to generate higher braking torque at a time of braking. The decelerating apparatuses are also required to suppress unnecessary braking torque generation at a time of non-braking.

An object of the present disclosure is to provide an eddy current decelerating apparatus that is capable of suppressing unnecessary braking torque generation at a time of non-braking and is capable of generating higher braking torque at a time of braking.

Solution to Problem

An eddy current decelerating apparatus according to art embodiment of the present disclosure includes a cylindrical brake member, plurality of primary permanent magnets, a cylindrical magnet holder, a plurality of secondary permanent magnets, a plurality of pole pieces, a stator, and a switching mechanism. The brake member is fixed to a rotary shaft. The primary permanent magnets are placed to face an inner or outer peripheral surface of the brake member with a gap in between. The primary permanent magnets are arranged in a circumferential direction of the brake member at regular intervals. Each of the primary permanent magnets has two opposite magnetic poles arranged in a radial direction of the brake member. The magnet holder holds the primary permanent magnets. The secondary permanent magnets are placed in the gap. The secondary permanent magnets are arranged in the circumferential direction at a pitch corresponding to the pitch of angular positions of the primary permanent magnets. Each of the secondary permanent magnets has two opposite magnetic poles arranged in the circumferential direction. The pole pieces are placed in the gap. Each of the pole pieces is positioned between and is in contact with two circumferentially adjacent ones of the secondary permanent magnets. The stator holds the secondary permanent magnets and the pole pieces. The switching mechanism is configured to rotate the magnet holder to switch the eddy current decelerating apparatus between a braking state and a non-braking state. Magnetic pole arrangements of two circumferentially adjacent ones of the primary permanent magnets are opposite to each other. Magnetic pole arrangements of two circumferentially adjacent ones of the secondary permanent magnets are opposite to each other. Each of the secondary permanent magnets has a trapezoidal cross-sectional shape including an upper base and a lower base. The upper base is on a side near the brake member. The lower base is on a side near the primary permanent magnets. The lower base is longer than the upper base. In the braking state, each of the secondary permanent magnets is positioned such that one end of the secondary permanent magnet with respect to the circumferential direction lies over, in the radial direction, one of the primary permanent magnets and such that the other end of the secondary permanent magnet with respect to the circumferential direction lies over, in the radial direction, another one of the primary permanent magnets. In this state, the one primary permanent magnet has, on a side near the secondary permanent magnet, a magnetic pole same as the magnetic pole of the one end of the secondary permanent magnet. The other permanent primary magnet has, on a side near the secondary permanent magnet, a magnetic pole same as the other end of the secondary permanent magnet. In the non-braking state, each of the secondary permanent magnets is positioned such that one end of the secondary permanent magnet with respect to the circumferential direction lies over, in the radial direction, one of the primary permanent magnets and such that the other end of the secondary permanent magnet with respect to the circumferential direction lies over, in the radial direction, another one of the primary permanent magnets. In this state, the one primary permanent magnet has, on a side near the secondary permanent magnet, a magnetic pole opposite to the magnetic pole of the one end of the secondary permanent magnet. The other primary limpet has, on a side near the secondary permanent magnet, a magnetic pole opposite to the other end of the secondary permanent magnet.

Advantageous Effect of Invention

An eddy current decelerating apparatus according to an embodiment of the present disclosure is capable of suppressing unnecessary braking torque generation at a time of non-braking and is capable of generating higher braking torque at a time of braking.

DETAILED DESCRIPTION OF EMBODIMENTS

Figure 1:
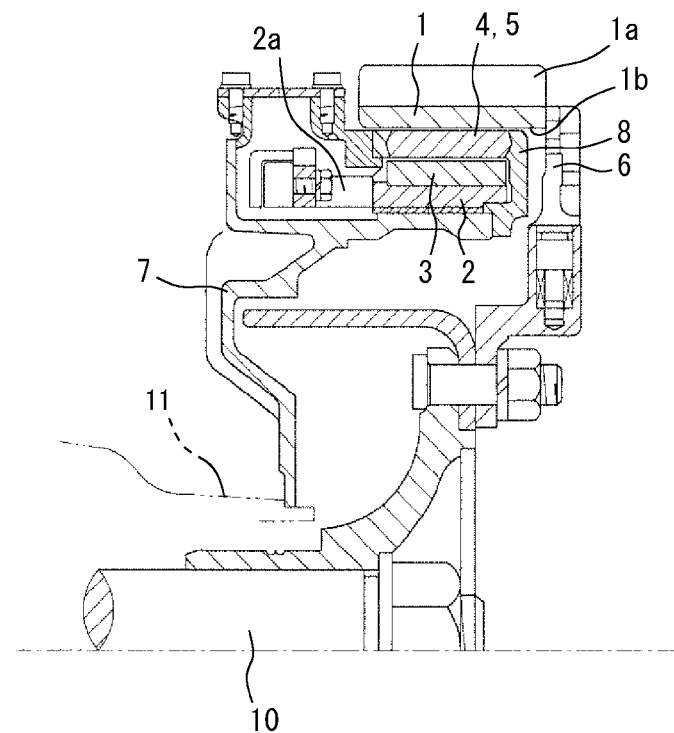
FIG. 1 is a vertical sectional view schematically illustrating a decelerating apparatus according to an embodiment of the present disclosure.

An embodiment of the present disclosure will hereinafter be described. In the following description, the embodiment of the present disclosure will be described with examples; however, the present disclosure is not limited to the examples given below. In the following description, specific values and specific materials will be given as examples; however, the present disclosure is not limited to the examples.

An eddy current decelerating apparatus according to an embodiment of the present disclosure includes a cylindrical brake member, a plurality of primary permanent magnets, a cylindrical magnet holder, a plurality of secondary permanent magnets, a plurality of pole pieces, a stator, and a switching mechanism. The brake member is fixed to a rotary shaft. The primary permanent magnets are placed to face an inner or outer peripheral surface of the brake member with a gap in between. The primary permanent magnets are arranged in a circumferential direction of the brake member at regular intervals. Each of the primary permanent magnets has two opposite magnetic poles arranged in a radial direction of the brake member. The magnetic holder holds the primary permanent magnets. The secondary permanent magnets are placed in the gap. The secondary permanent magnets are arranged in the circumferential direction at a pitch corresponding to the pitch of angular positions of the primary permanent magnets. Each of the secondary permanent magnets has two opposite magnetic poles arranged in the circumferential direction. The pole pieces are placed in the gap. Each of the pole pieces is positioned between and is in contact with two circumferentially adjacent ones of the secondary permanent magnets. The stator holds the secondary permanent magnets and the pole pieces. The switching mechanism is configured to rotate the magnet holder to switch the decelerating apparatus between a braking state and a non-braking state. Magnetic pole arrangements of two circumferentially adjacent ones of the primary permanent magnets are opposite to each other. Magnetic pole arrangements of two circumferentially adjacent ones of the secondary permanent magnets are opposite to each other. Each of the secondary permanent magnets has a trapezoidal cross-sectional shape including an upper base and a lower base. The upper base is on a side near the brake member. The lower base is on a side near the primary permanent magnets. The lower base is longer than the upper base. In the braking state, each of the secondary permanent magnets is positioned such that one end of the secondary permanent magnet with respect to the circumferential direction lies over, in the radial direction, one of the primary permanent magnets and such that the other end of the secondary permanent magnet with respect to the circumferential direction lies over, in the radial direction, another one of the primary permanent magnets. In this state, the one primary permanent magnet has, on a side near the secondary permanent magnet, a magnetic pole same as the magnetic pole of the one end of the secondary permanent magnet. The other primary magnet has, on a side near the secondary permanent magnet, a magnetic pole same as the other end of the secondary permanent magnet. In the non-braking state, each of the secondary permanent magnets is positioned such that one end of the secondary permanent magnet with respect to the circumferential direction lies over, in the radial direction, one of the primary permanent magnets and such that the other end of the secondary permanent magnet with respect to the circumferential direction lies over, in the radial direction, another one of the primary permanent magnets. In this state, the one primary permanent magnet has, on a side near the secondary permanent magnet, a magnetic pole opposite to the magnetic pole of the one end of the secondary permanent magnet. The other primary magnet has, on a side near the secondary permanent magnet, a magnetic pole opposite to the other end of the secondary permanent magnet.

In the decelerating apparatus according to the present embodiment, the magnet holder is rotated relative to the stator by the switching mechanism, and thereby, the decelerating apparatus is switched between the braking state and the non-braking state. Each of the secondary permanent magnets has a trapezoidal cross-sectional shape, and therefore, in either of the braking state or the non-braking state, one pole piece and circumferential end portions of two secondary permanent magnets in contact with the pole piece lie over, in the radial direction, each of the primary permanent magnets. In other words, when the circumferentially arranged secondary permanent magnets are viewed from the inner periphery or the outer periphery, the end portions of the secondary permanent magnets lie over the primary permanent magnets. In the braking state, each end portion of each of the secondary permanent magnets has a magnetic pole (for example, N) same as the magnetic pole (for example, N) of the side of the primary permanent magnet facing the end portion of the secondary permanent magnet. On the other hand, in the non-braking state, each end portion of each of the secondary permanent magnets has a magnetic pole (for example, S) opposite to the magnetic pole (for example, N) of the side of the primary permanent magnet facing the end portion of the secondary permanent magnet. In the present embodiment, cross section means a section perpendicular to the rotation axis.

In the braking state, two circumferentially adjacent primary permanent magnets form a magnetic circuit between the two adjacent primary permanent magnets, two circumferentially adjacent pole pieces, the magnetic holder, and the brake member. Further, one secondary permanent magnet forms a magnetic circuit between the secondary permanent magnet, two circumferentially adjacent pole pieces, and the brake member.

Accordingly, in the decelerating apparatus of the present embodiment, in the braking state, a magnetic flux outgoing from the secondary permanent magnets is superimposed on a magnetic flux outgoing from the primary permanent magnets, and thereby, a strengthened magnetic flux reaches the brake member. Therefore, large eddy currents are generated on the brake member rotating together with the rotary shaft. This makes it possible to achieve high braking torque.

On the other hand, in the non-braking state, two circumferentially adjacent primary permanent magnets and one secondary permanent magnet mainly form a magnetic circuit between the two adjacent primary permanent magnets, the secondary permanent magnet, and the magnet holder.

Accordingly, in the decelerating apparatus of the present embodiment, in the braking state, there is only little magnetic flux leakage from the primary and secondary permanent magnets to the brake member. Accordingly, only very small eddy currents are generated on the brake member rotating together with the rotary shaft, and it is possible to suppress unnecessary braking torque generation.

In a typical example of the decelerating apparatus of the present embodiment, the plurality of primary permanent magnets are arranged at an inner side of the brake member to face an inner peripheral surface of the brake member with a gap in between. In this case, the plurality of secondary primary magnets and the plurality of pole pieces are arranged in the gap between the inner peripheral surface of the brake member and the outer peripheral surfaces of the primary permanent magnets. The pitch of angular positions of the secondary permanent magnets around the rotary shaft is the same as the pitch of angular positions of the primary permanent magnets around the rotary shaft. The pitch of angular positions of the pole pieces around the rotation axis of the rotary shaft is the same as the pitch of angular positions of the primary permanent magnets around the rotary shaft.

In the decelerating apparatus of the present embodiment, each of the secondary permanent magnets, which are trapezoidal in cross section, may have round corners. Specifically, in the trapezoidal cross section of each of the secondary permanent magnets, the upper base may be connected to legs via circular arcs, and/or the lower base may be connected to the legs via circular arcs. Alternatively, in the trapezoidal cross section of each of the secondary permanent magnets, the corners may be beveled. In other words, in the trapezoidal cross section of each of the secondary permanent magnets, there may be a straight line between the upper base and each of the legs and/or between the lower base and each of the legs.

In the typical example of the decelerating apparatus of the present embodiment, primary air gaps are provided between the secondary permanent magnets such that each of the primary air gaps lies between mutually facing ends, with respect to the circumferential direction, of two circumferentially adjacent ones of the secondary permanent magnets. The primary air gaps serve as some magnetic resistance. In the braking state, two circumferentially adjacent primary permanent magnets and one secondary permanent form a magnetic circuit between the two adjacent primary permanent magnets, two circumferentially adjacent pole pieces, the magnet holder, and the brake member. Then, a magnetic flux outgoing from the north pole of one of the two adjacent primary permanent magnets and a magnetic flux outgoing from the north pole of the secondary permanent magnet are strengthened by each other and effectively conducted to one of the two adjacent pole pieces through one primary air gap. The magnetic flux which has been conducted to the pole piece through the primary air gap is attracted by the south pole of the secondary permanent magnet and effectively reaches the south pole of the other of the two adjacent primary permanent magnets through another primary air gap. Thus, the primary air gaps also serve as parts of the magnetic flux path. Therefore, it is possible to ensure a sufficiently high volume of magnetic flux flowing through the primary and secondary permanent magnets and the pole pieces.

In the typical example of the decelerating apparatus of the present embodiment, secondary air gaps are provided between the pole pieces such that each of the secondary air gaps lies between mutually facing ends, with respect to the circumferential direction, of two circumferentially adjacent ones of the pole pieces. In the braking state, each of the secondary permanent magnets forms a magnetic circuit between the secondary permanent magnet, two circumferentially adjacent pole pieces, and the brake member. In this state, the secondary air gap between the two adjacent pole pieces effectively prevents short-circuiting from one of the pole pieces to the other pole piece. Also, self short-circuiting of the secondary permanent magnet can be prevented.

An eddy current decelerating apparatus according to an embodiment of the present disclosure will hereinafter be described in detail.

Figure 2:
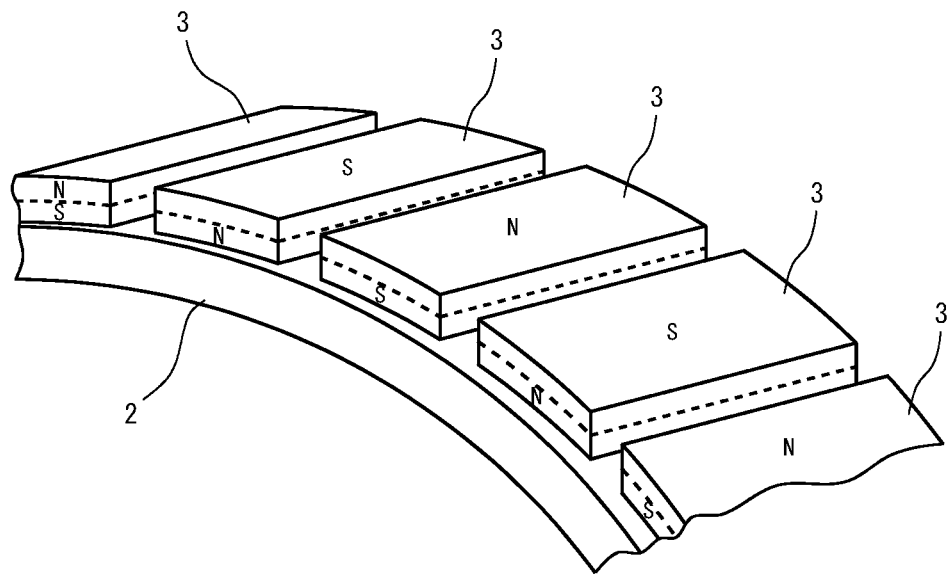
FIG. 2 is a perspective view illustrating arrangement of primary permanent magnets in the decelerating apparatus illustrated in FIG. 1.
Figure 3:
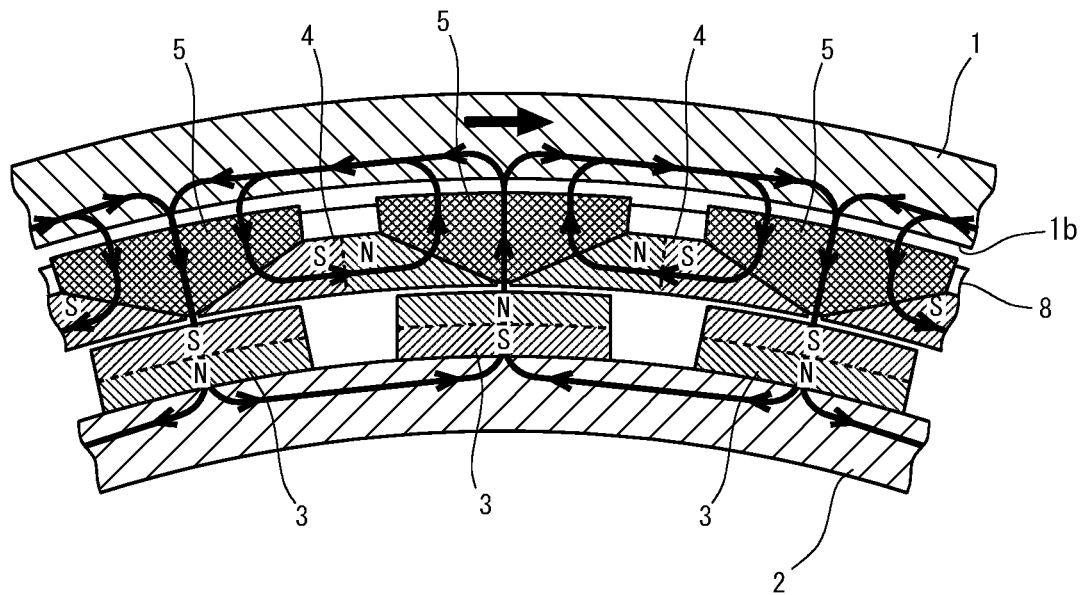
FIG. 3 is a cross-sectional view of magnetic circuits in the decelerating apparatus illustrated in FIG. 1 when the decelerating apparatus is in a braking state.
Figure 4:
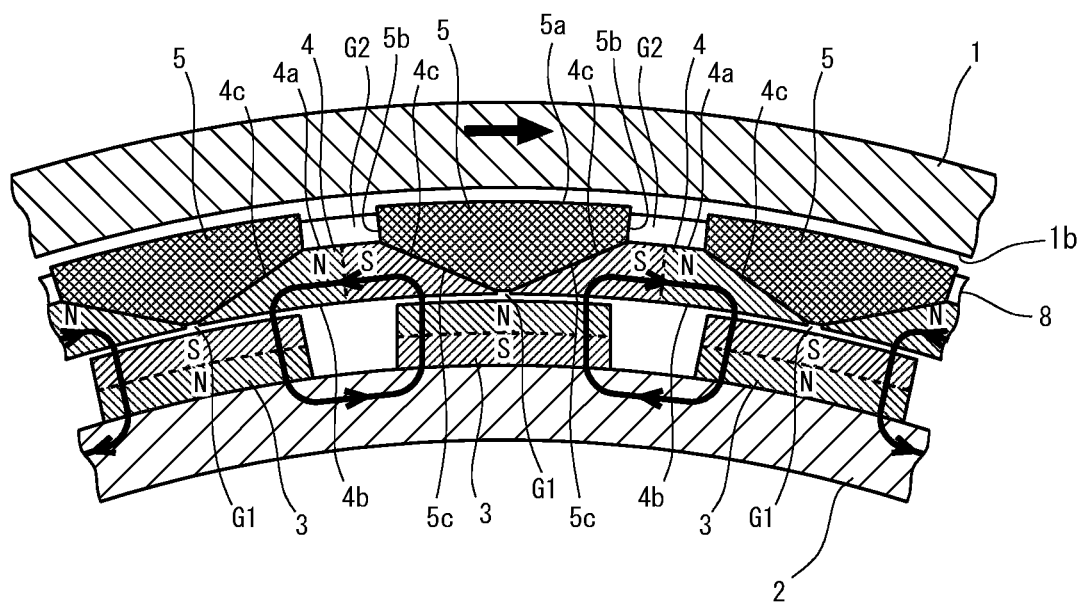
FIG. 4 is a cross-sectional view of magnetic circuits in the decelerating apparatus illustrated in FIG. 1 when the decelerating apparatus is in a non-braking state.

FIG. 1 is a vertical sectional view of a decelerating apparatus according to the embodiment. FIG. 2 is a perspective view showing the arrangement of primary permanent magnets of the decelerating apparatus illustrated in FIG. 1. FIGS. 3 and 4 are cross-sectional views showing magnetic circuits in the decelerating apparatus illustrated in FIG. 1. FIG. 3 shows a braking state, and FIG. 4 shows a non-braking state. In FIGS. 3 and 4, magnetic circuits are schematically indicated by solid lines, and directions of magnetic fluxes are indicated by arrows on the solid lines. In this specification, a vertical section means a section along a rotation axis. A cross section means a section perpendicular to the rotation axis.

With reference to FIGS. 1 to 4, the decelerating apparatus includes a cylindrical brake member 1, and a cylindrical magnet holder 2 placed at an inner side of the brake member 1. The brake member 1 is fixed to a rotary shaft 10 (for example, a propeller shaft, a drive shaft, or the like) of a vehicle via a rotor support 6 (see FIG. 1). Thereby, the brake member 1 rotates together with the rotary shaft 10. The solid arrows in FIGS. 3 and 4 indicate an example of the direction of rotation of the brake member 1. On the outer peripheral surface of the brake member 1, radiating fins 1a are provided (see FIG. 1). These radiating fins 1a function to cool down the brake member 1 directly.

The magnetic holder 2 is paired with the brake member 1, and the magnetic holder 2 and the brake member 1 are coaxially arranged. The magnetic holder 2 is arranged to be slidable relative to a stator support 7, which is fixed to a non-rotative part 11 (for example, a transmission cover) of the vehicle, via, a ring-shaped slide plate, for example. Accordingly, the magnetic holder 2 is held in a manner to be rotatable relative to the rotary shaft 10. In other words, the magnetic holder 2 is supported by the non-rotative part 11 via the stator support 7 so as not to rotate together with the rotary shaft 10.

As shown in FIGS. 1 and 2, a plurality of primary permanent magnets 3 are fixed on the outer peripheral surface of the magnetic holder 2. The primary permanent magnets 3 are arranged in a circumferential direction of the brake member 1 and the magnet holder 2, which have a center on the rotary shaft 10, at regular intervals to face the inner peripheral surface 1b of the brake member 1 with a gap in between. In other words, the primary permanent magnets 3 are circumferentially arranged at regular intervals on the whole circumference a the magnetic holder 2. Each of the primary permanent magnets 3 has two opposite magnetic poles (a north pole (N) and a south pole (S)). Each of the primary permanent magnets 3 is positioned such that the magnetic poles (N and S) thereof are arranged in a radial direction of the brake member 1 and the magnetic holder 2, which have a center on the rotary shaft 10. The magnetic pole (N and S) arrangements of two circumferentially adjacent ones of the primary permanent magnets 3 are opposite to each other (see FIGS. 2 to 4). The magnet holder 2 is made of a ferromagnetic material (for example, carbon steel, cast iron or the like).

As shown in FIGS. 1, 3 and 4, in the gap between the inner peripheral surface 1b of the brake member 1 and the outer peripheral surfaces of the primary permanent magnets 3, a plurality of secondary permanent magnets 4 and a plurality of ferromagnetic pole pieces 5 are provided. The secondary permanent magnets 4 are arranged in the circumferential direction of the brake member 1, which has a center on the rotary shaft 10. Each of the secondary permanent magnets 4 has two opposite magnetic poles (a north pole (N) and a south pole (S)) arranged in the circumferential direction. The magnetic pole (N and S) arrangements of two circumferentially adjacent ones of the secondary permanent magnets 4 are opposite to each other (see FIGS. 3 and 4). The pole pieces 5 are arranged between the secondary permanent magnets 4 such that each of the pole pieces 5 lies between and is in contact with two circumferentially adjacent ones of the secondary permanent magnets 4. The pitch of angular positions of the secondary permanent magnets 4 around the rotary shaft 10 corresponds to the pitch of angular positions of the primary permanent magnets 3 around the rotary shaft 10. The pitch of angular positions of the pole pieces 5 around the rotary shaft 10 corresponds to the pitch of angular positions of the primary permanent magnets 3 around the rotary shaft 10.

Both sides of the secondary permanent magnets 4 and both sides of the pole pieces 5 are held by a ring-shaped stator 8. The secondary permanent magnets 4 and the pole pieces 5 are arranged on the whole circumference of the stator 8. The stator 8 is fixed to the stator support 7. Thus, the stator 8 is held via the stator support 7 so as to be rotatable relative to the rotary shaft 10 (see FIG. 1). In other words, the stator 8 is supported by the non-rotative part 11 of the vehicle via the stator support 7 so as not to rotate together with the rotary shaft 10 of the vehicle.

As shown in FIGS. 3 and 4, each of the secondary permanent magnets 4 is trapezoidal in section perpendicular to the rotary shaft 10 (in cross section). As shown in FIG. 4, each of the secondary permanent magnets 4 has an upper base 4a, a lower base 4b, and legs 4c, when viewed in cross section. The upper base 4a is located on the side near the brake member 1. The lower base 4b is longer than the upper base 4a and is located on the side near the primary permanent magnets 3. The legs 4c connect the upper base 4a and the lower base 4b. Each of the legs 4c forms an acute angle (greater than 0 degrees and smaller than 90 degrees) with the lower base 4b. When the leg 4c and the base 4b is connected by a circular arc or another straight line, the extended line of the leg 4c forms an acute angle with the extended line of the lower base 4b. When viewed in cross section, each of the secondary permanent magnets 4 decreases in thickness (dimension in the radial direction) with decreasing distance from either end in the circumferential direction. In other words, in each of the secondary permanent magnets 4, the volume in both end portions in the circumferential direction is smaller than the volume in a central portion in the circumferential direction.

It is preferred that each of the secondary permanent magnets 4 is substantially in the shape of an isosceles trapezoid in cross section. This means that each of the secondary permanent magnets 4 is designed to be in the shape of an isosceles trapezoid in cross section, and asymmetry caused by a dimension error or the like in the manufacturing process shall be tolerated.

As shown in FIG. 4, each of the pole pieces 5 is substantially pentagonal (in the shape of a home base) in section perpendicular to the rotary shaft 10 (in cross section). When viewed in cross section, each of the pole pieces 5 has a base 5a facing the brake member 1, opposite sides 5b extending from end points of the base 5a toward the secondary permanent magnets 4, and oblique sides 5c that are in contact with the legs 4c of the secondary permanent magnets 4. When viewed in cross section, each of the pole pieces 5 increases in thickness (dimension in the radial direction) with decreasing distance from the center in the circumferential direction. The maximum thickness of each of the pole pieces 5 is greater than the maximum thickness of each of the secondary permanent magnets 4. In each of the pole pieces 5, the volume in a central portion in the circumferential direction is greater than the volume in both end portions in the circumferential direction.

As shown in FIG. 4, primary air gaps G1 are provided between the secondary permanent magnets 4 such that each of the primary air gaps G1 lies between mutually facing ends, with respect to the circumferential direction, of two circumferentially adjacent secondary permanent magnets 4. The primary air gaps G1 are in contact with the surfaces of the pole pieces 5 near the primary permanent magnets 3. Since the maximum thickness of the pole pieces 5 is greater than the maximum thickness of the secondary permanent magnets 4, secondary air gaps G2 are formed between the circumferentially arranged pole pieces 5. Each of the secondary air gaps G2 is formed between the mutually facing sides 5b of two circumferentially adjacent pole pieces 5. The secondary air gaps G2 are in contact with the surfaces of the secondary permanent magnets 4 near the brake member 1 (the upper bases 4a). Each of the primary air gaps G1 is a gap between two adjacent secondary permanent magnets 4, and each of the primary air gaps G1 may be merely a space (air) or a non-magnetic material filled therein. Similarly, each of the secondary air gaps G2 is a gap between two adjacent pole pieces 5, and each of the secondary air gaps G2 may be merely a space (air) or a non-magnetic material filled therein.

The switching mechanism is configured to rotate the magnetic holder 2. The switching mechanism includes a lever 2a protruding from a side surface of the magnet holder 2 (see FIG. 1). A drive unit (not shown) including an air cylinder, an electric actuator, etc. is connected to the lever 2a via a link mechanism. When switching from the braking state to the non-braking state and vice versa, the drive unit operates to rotate the magnets holder 2 and the primary permanent magnets 3 together. Thereby, the primary permanent magnets 3, the secondary permanent magnets 4 and the pole pieces 5 are set in a position for the braking state or a position for the non-breaking state.

Referring to FIG. 3, in the braking state, one pole piece 5 and circumferential end portions of two secondary permanent magnets 4 that are in contact with the pole piece 5 lie over, in the radial direction, each of the primary permanent magnets 3 (when viewed in the radial direction). In other words, each of the primary permanent magnets 3 is positioned across two circumferentially adjacent secondary permanent magnets 4 and faces the end portions (the corners between the lower ends 4b and the legs 4c (see FIG. 4)) of the two adjacent secondary permanent magnets 4. At the time, the end portions of the two adjacent secondary permanent magnets 4 overlapping the primary permanent magnet 3 have a magnetic pole (for example, N) same as the magnetic pole (for example, N) on the side of the primary permanent magnets 3 facing the secondary permanent magnets 4. Referring to FIG. 4, in the non-braking state, as in the braking state, one pole piece 5 and circumferential end portions of two secondary personal magnets 4 that are in contact with the pole piece 5 lie over, in the radial direction, each of the primary permanent magnets 3 (when viewed in the radial direction). In other words, each of the primary permanent magnets 3 is positioned across two circumferentially adjacent secondary permanent magnets 4 and faces the end portions (the corners between the lower ends 4b and the legs 4c (see FIG. 4)) of the two adjacent secondary permanent magnets 4. At the time, the end portions of the two adjacent secondary permanent magnets 4 overlapping the primary permanent magnet 3 have a magnetic pole (for example, S) opposite to the magnetic pole (for example, N) on the side of the primary permanent magnet 3 facing the secondary permanent magnets 4. By rotating the magnetic holder 2 relative to the stator 8 by an angle corresponding to the pitch of angular positions of the primary permanent magnets 3 (the secondary permanent magnets 4 and the pole pieces 5), switching between the braking state and the non-braking state can be performed.

As shown in FIG. 3, in the braking state, a magnetic flux outgoing from the north pole of a first one of the two circumferentially adjacent primary permanent magnets 3 is superimposed on magnetic fluxes outgoing from the north poles of the two secondary permanent magnets 4 overlapping the first primary permanent magnet 3, and is conducted to a pole piece 5 overlapping the first primary permanent magnet 3 via an air gap G1. The magnetic flux conducted to the first pole piece 5 reaches the brake member 1 that is opposed to the pole piece 5 and the first primary permanent magnet 3. The magnetic flux that has reached the brake member 1 is conducted to another pole piece 5 overlapping the other (second) one of the two circumferentially adjacent primary permanent magnets 3 and reaches the south pole of the second primary permanent magnet 3. The magnetic flux outgoing from the north pole of the second primary permanent magnet 3 reaches the south pole of the first primary permanent magnet 3 via the magnetic holder 2.

Meanwhile, a magnetic flux outgoing from the north pole of a secondary permanent magnet 4 is superimposed on the magnetic flux outgoing from the north pole of the primary permanent magnet 3 overlapping the north pole of the secondary permanent magnet 4, and is conducted to a pole piece 5 that is in contact with the north pole of the secondary permanent magnet 4. The magnetic flux conducted to the pole piece 5 reaches the brake member 1 that is opposed to the pole piece 5 and the first primary permanent magnet 3. The magnetic flux that has reached the brake member 1 reaches the south pole of the secondary permanent magnet 4 via another pole piece 5 that is in contact with the south pole of the secondary permanent magnet 4.

Thus, in the braking state, two circumferentially adjacent primary permanent magnets 3 form a magnetic circuit between these two circumferentially adjacent primary permanent magnets 3, two circumferentially adjacent pole pieces 5, the magnetic holder 2, and the brake member 1. Also, a secondary permanent magnet 4 forms a magnetic circuit between this secondary permanent magnet 4, two circumferentially adjacent pole pieces 5, and the brake member 1. Such magnetic circuits are formed in the entire circumference. In this regard, concerning the magnetic circuits formed by the primary permanent magnets 3, the direction of magnetic fluxes in adjacent magnetic circuits are opposite to each other, and concerning the magnetic circuits formed by the secondary permanent magnets 4, the directions of magnetic fluxes in adjacent magnetic circuits are opposite to each other.

In a state in which there is a relative difference between the rotating speed of the primary and secondary permanent magnets 3, 4 and the rotating speed of the brake member 1, when magnetic fields formed by the primary and secondary permanent magnets 3 and 4 act on the brake member 1, eddy currents are generated on the inner peripheral surface 1b of the brake member 1 that is opposed to the primary permanent magnets 3. By the interaction between these eddy currents and the density of magnetic fluxes outgoing from the primary and secondary permanent magnets 3 and 4, according to the Fleming's left-hand rule, a brake torque is generated in a direction opposite to the rotation direction of the brake member 1 rotating together with the rotary shaft 10.

Thus, in the decelerating apparatus of the present embodiment, in the braking state, the magnetic fluxes outgoing from the secondary permanent magnets 4 are superimposed on the magnetic fluxes outgoing from the primary permanent magnets 3, and thereby, enhanced magnetic fluxes reach the brake member 1. Accordingly, larger eddy-current flows are generated in the brake member 1 rotating together with the rotary shaft 10. Thus, a high brake torque can be produced.

On the other hand, in the non-braking state, as shown in FIG. 4, a magnetic flux outgoing from the north pole of a first one of two circumferentially adjacent primary permanent magnets 3 directly reaches the south pole of a secondary permanent magnets 4 overlapping the first primary permanent magnet 3. The magnetic flux outgoing from the north pole of the secondary permanent magnet 4 directly reaches the south pole of the other (second) one of the two adjacent primary permanent magnets 3 overlapping the north pole of the secondary permanent magnet 4. The magnetic flux outgoing from the north pole of the second primary permanent magnet 3 reaches the south pole of the first primary permanent magnet 3 via the magnet holder 2.

Thus, in the non-braking state, a magnetic circuit is formed by two circumferentially adjacent primary permanent magnets 3 and a secondary permanent magnet 4 between these primary and secondary permanent magnets 3 and 4 and the magnet holder 2. Such magnetic circuits are formed in the entire circumference such that the directions of magnetic fluxes in adjacent magnetic circuits are opposite to each other.

Therefore, in the decelerating apparatus of the present embodiment, in the non-braking state, the magnetic fluxes outgoing from the primary and secondary permanent magnets 3 and 4 certainly do not reach the brake member 1. In other words, undesired magnetic flux leakage from the primary and secondary permanent magnets 3 and 4 to the brake member 1 can be prevented. In this state, accordingly, no eddy currents are generated on the brake member 1 rotating together with the rotary shaft 10, and unnecessary brake torque generation can be avoided.

For example, the brake member 1 is made of a ferromagnetic material (for example, carbon steel, cast iron, etc.). The inner peripheral surface 1b of the brake member 1 may be plated with copper, which is high in electric conductivity. When the inner peripheral surface 1b is plated with copper, the eddy currents generated thereon in the braking state become larger. This further enhances the brake torque.

Regarding a permanent magnet, generally, a magnetic flux outgoing from the central portion with respect to the direction of magnetic pole arrangement (N and S arrangement) goes less straight, and a magnetic flax outgoing from either end portion with respect to the direction of magnetic pole arrangement goes more straight. In consideration of this fact, each of the secondary permanent magnets 4 is made trapezoidal in cross section such that the volume thereof is smaller in a portion closer to either end in the circumferential direction. Thereby, the magnetic flux outgoing from either end portion of each of the secondary permanent magnets 4 is decreased, and it is possible to prevent a magnetic flax leakage from a secondary permanent magnet 4 to an adjacent secondary permanent magnet 4 in the braking state. Further, each of the pole pieces 5, which is positioned between two adjacent secondary permanent magnets 4, is made pentagonal in cross section such that the volume thereof is greater in a portion closer to the center in the circumferential direction. In the braking state, the pole piece 5 with such a shape certainly prevents a magnetic flux leakage from one of the two adjacent secondary permanent magnets 4 to the other secondary permanent magnet 4, and thereby, the magnetic fluxes outgoing from the secondary permanent magnets 4 can be certainly directed to the brake member 1 (see FIG. 3). Therefore, in the decelerating apparatus of the present embodiment, a brake torque can be effectively generated.

In the decelerating apparatus of the present embodiment, the secondary air gaps G2 are provided between the circumferentially arranged pole pieces 5. The surfaces (upper bases 4a) of the secondary permanent magnets 4 which face the brake member 1 are exposed to the secondary air gaps G2. In other words, the surfaces of the secondary permanent magnets 4 facing the brake member 1 are not covered with any ferromagnetic material like the pole pieces 5. Accordingly, it is possible to lessen the possibility in the braking state that the magnetic fluxes outgoing from the secondary permanent magnets 4 return to the secondary permanent magnets 4 themselves without reaching the brake member 1 (self short-circuiting), and it is possible to effectively generate a braking torque in the braking state.

In the decelerating apparatus of the present embodiment, the primary air gaps G1 are provided between the circumferentially adjacent secondary permanent magnets 4 such that each of the primary air gaps G1 is located between a primary permanent magnet 3 and a pole piece 5. As mentioned above, the primary air gaps G1 may be spaces (air) or a non-magnetic material filled therein, and the primary air gaps G1 are relatively high in magnetic resistance. Accordingly, it is possible to lessen the possibility in the non-braking state that the magnetic fluxes outgoing from the primary permanent magnets 3 leak toward the pole pieces 5, and the magnetic fluxes outgoing from the primary permanent magnets 3 is conducted to the secondary permanent magnets 4 more certainly (FIG. 4). As a result, unnecessary braking torque generation in the non-braking state can be effectively prevented.

In the braking state, the primary air gaps G1 substantially do not prevent the primary and secondary permanent magnets 3 and 4 from generating magnetic circuits. Specifically, in the braking state, two circumferentially adjacent primary magnets 3 and one secondary permanent magnet 4 form magnetic circuits between the brake member 1, the magnet holder 2, the circumferentially adjacent primary permanent magnets 3, and two circumferentially adjacent pole pieces 5. In this state, the magnetic flux outgoing from the north pole of one of the circumferentially adjacent primary permanent magnets 3 and the magnetic flux outgoing from the north pole of the secondary permanent magnet 4 are strengthened by each other and are effectively conducted to one of the adjacent pole pieces 5 via a primary air gap G1. The magnetic flux conducted to the pole piece 5 is conducted to the other pole piece 5 via the brake member 1 and thereafter is attracted by the south pole of the secondary magnet 4. Thereby, the magnetic flux effectively reaches the south pole of the other primary permanent magnet 3. Therefore, it is possible to ensure a sufficiently high volume of magnetic flux flowing through the primary and secondary permanent magnets 3, 4 and the pole pieces 5. Thus, in the braking state, the primary air gaps G1 serve as parts of the magnetic flux path though they have slight magnetic resistance.

The present disclosure is not limited to the above-described embodiment, and various changes and modifications may be made to the embodiment without departing from the scope of the present disclosure.

INDUSTRIAL APPLICABILITY

The eddy current decelerating apparatus according to the present disclosure can be effectively utilized as an auxiliary brake in any kind of vehicle.

LIST OF REFERENCE SYMBOLS

1: brake member
1b: inner peripheral surface of brake member
2: magnet holder
3: primary permanent magnet
4: secondary permanent magnet
4a: upper base of secondary permanent magnet
4b: lower base of secondary permanent magnet
4c: leg of secondary permanent magnet
5: pole piece
8: stator
10: rotary shaft

The invention claimed is:

1. An eddy current decelerating apparatus comprising:
a cylindrical brake member fixed to a rotary shaft;
a plurality of primary permanent magnets that are arranged in a circumferential direction of the brake member at regular intervals to face an inner or outer peripheral surface of the brake member with a gap in between, each of the primary permanent magnets having two opposite magnetic poles arranged in a radial direction of the brake member;
a cylindrical magnet holder holding the primary permanent magnets;
a plurality of secondary permanent magnets that are placed in the gap to be arranged in the circumferential direction at a pitch corresponding to a pitch of angular positions of the primary permanent magnets, each of the secondary permanent magnets having two opposite magnetic poles arranged in the circumferential direction;
a plurality of pole pieces that are placed in the gap such that each of the pole pieces is positioned between and is in contact with two circumferentially adjacent ones of the secondary permanent magnets;
a stator holding the secondary permanent magnets and the pole pieces; and
a switching mechanism configured to rotate the magnet holder to switch the eddy current decelerating apparatus between a braking state and a non-braking state;
wherein:
magnetic pole arrangements of two circumferentially adjacent ones of the primary permanent magnets are opposite to each other;
magnetic pole arrangements of two circumferentially adjacent ones of the secondary permanent magnets are opposite to each other;
each of the secondary permanent magnets has a trapezoidal cross-sectional shape including an upper base on a side near the brake member and a lower base on a side near the primary permanent magnets, the lower base being longer than the upper base;
in the braking state, each of the secondary permanent magnets is positioned such that one end of the secondary permanent magnet with respect to the circumferential direction lies over, in the radial direction, one of the primary permanent magnets that has, on a side near the secondary permanent magnet, a magnetic pole same as the magnetic pole of the one end of the secondary permanent magnet and such that the other end of the secondary permanent magnet with respect to the circumferential direction lies over, in the radial direction, another one of the primary permanent magnets that has, on a side near the secondary permanent magnet, a magnetic pole same as the other end of the secondary permanent magnet; and
in the non-braking state, each of the secondary permanent magnets are positioned such that one end of the secondary permanent magnet with respect to the circumferential direction lies over, in the radial direction, one of the primary permanent magnets that has, on a side near the secondary permanent magnet, a magnetic pole opposite to the magnetic pole of the one end of the secondary permanent magnet and such that the other end of the secondary permanent magnet with respect to the circumferential direction lies over, in the radial direction, another one of the primary permanent magnets that has, on a side near the secondary permanent magnet, a magnetic pole opposite to the other end of the secondary permanent magnet.

2. The eddy current decelerating apparatus according to claim 1, wherein primary air gaps are provided between the secondary permanent magnets such that each of the primary air gaps lies between mutually facing ends, with respect to the circumferential direction, of two circumferentially adjacent ones of the secondary permanent magnets.

3. The eddy current decelerating apparatus according to claim 2, wherein secondary air gaps are provided between the pole pieces such that each of the secondary air gaps lies between mutually facing ends, with respect to the circumferential direction, of two circumferentially adjacent ones of the pole pieces.

4. The eddy current decelerating apparatus according to claim 1, wherein secondary air gaps are provided between the pole pieces such that each of the secondary air gaps lies between mutually facing ends, with respect to the circumferential direction, of two circumferentially adjacent ones of the pole pieces.

* * * * *